US010529039B2

(12) United States Patent
Theobald (10) Patent No.: US 10,529,039 B2
(45) Date of Patent: *Jan. 7, 2020

(54) COMMUNICATION OF ORDERS AND PAYMENTS IN A DRIVE THROUGH USING WIRELESS BEACONS

(71) Applicant: PayPal, Inc., San Jose, CA (US)

(72) Inventor: Dwain Glenn Theobald, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/584,256

(22) Filed: May 2, 2017

(65) Prior Publication Data

US 2017/0301046 A1     Oct. 19, 2017

Related U.S. Application Data

(63) Continuation of application No. 14/318,162, filed on Jun. 27, 2014, now Pat. No. 9,639,907.

(51) Int. Cl.
*G06Q 50/12* (2012.01)
*G06Q 20/32* (2012.01)
*H04W 40/24* (2009.01)
*H04W 4/80* (2018.01)
*H04W 76/14* (2018.01)

(52) U.S. Cl.
CPC .......... *G06Q 50/12* (2013.01); *G06Q 20/327* (2013.01); *H04W 4/80* (2018.02); *H04W 40/244* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 8,965,411 B1 | 2/2015 | Busch-Sorensen et al. | |
| 9,639,907 B2 * | 5/2017 | Theobald | G06Q 50/12 |
| 2004/0054592 A1 | 3/2004 | Hernblad | |
| 2007/0088624 A1 | 4/2007 | Vaughn et al. | |
| 2007/0205278 A1 | 9/2007 | Lovett | |
| 2014/0100971 A1 | 4/2014 | Klearman | |
| 2014/0164122 A1 | 6/2014 | Wissner-Gross et al. | |

* cited by examiner

*Primary Examiner* — Paul Danneman
(74) *Attorney, Agent, or Firm* — Haynes and Boone, LLP (57) ABSTRACT

There are provided systems and methods for communication of orders and payments in a drive through using wireless beacons. A merchant location may include a drive through with a wireless beacon established in the drive through. The beacon may provide communication services with a device for the user. The merchant may detect that the user is in a vehicle in the drive through using either the connection between the device of the user and the beacon or a camera, sensor, or other detector located near the beacon in the drive through. Based on check-in information generated on the connection, an order for the user may be accessed. The user may pay for the order using the device and through the connection to the beacon. Further, if other devices for additional users in the vehicle connect to the beacon, the additional users may split the payment for the order.

20 Claims, 5 Drawing Sheets

COMMUNICATION OF ORDERS AND PAYMENTS IN A DRIVE THROUGH USING WIRELESS BEACONS

CROSS REFERENCED TO RELATED APPLICATIONS

This application is a continuation of U.S. application Ser. No. 14/318,162, filed on Jun. 27, 2014, and issued as U.S. Pat. No. 9,639,907 on May 2, 2017, the contents of which are incorporated by reference in its entirety.

TECHNICAL FIELD

The present application generally relates to communication of orders and payments in a drive through using wireless beacons and more specifically to establishing a wireless beacon in a merchant's drive through that may connect to a user's device to facilitate ordering and paying at the drive through.

BACKGROUND

Some merchants may offer a drive through at their merchant location where a user may complete sales transaction for items or services without ever having to leave their vehicle. The users may pull up to an ordering window and interface with a merchant representative who may take an order for the user. The user may then traverse through the drive through to a payment window where the user may provide payment for the items the user requested. However, since the merchant representative taking the user's order is unlikely to remember the user, past orders of the user from previous visits are not recalled for easy and expedient ordering. Even if one merchant representative does recall the user, the user may travel to another location for the same merchant (e.g., a fast food chain), where the user may not have familiarity with the menu layout, items, etc. Thus, the user may spend added time browsing the menu or be required to again interface with a new merchant representative. Furthermore, once the user has completed ordering and is ready to pay, the user is required to present cash or a payment card, which may not be the preferred payment instrument for the user.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide communication of orders and payments in a drive through using wireless beacons. Systems suitable for practicing methods of the present disclosure are also provided.

Various merchant locations may provide short range wireless communications with a device, such as through beacons using Bluetooth Low Energy (BLE), LTE Direct, or other communication protocol. These beacons may be set up at a merchant location, such as a merchant's drive through, and communicate with devices to alert users of check-in services through their device. The beacons may provide additional functionality, such as establishing a connection with a device or server entity to complete transactions, including ordering and payment services. The beacons may provide communications to the users' devices directly, including information stored in the beacons. The beacons may also provide communication with a device attached to, or in communication with, the beacon, such as a device of a merchant.

A merchant may offer a drive through at the merchant's location where a user may place and/or pick up an order while the user is in their vehicle. Additionally, the merchant may offer check-in services through one or more short range wireless beacons established in the drive through for the merchant. For example, merchants may correspond to fast food restaurants, banks, pharmacies, etc. These beacons at the merchant may utilize a short range wireless communications to communicate with a device of the user. For example, the beacons may be established at an entry to the drive through, in individual lanes of a multiple lane the drive through, next to a menu of available items from the merchant, and/or near an ordering intercom for the drive through. The beacons may employ Bluetooth Low Energy (BLE), LTE Direct, or another communication protocol to emit a communication signal receivable by the user's device. The communication may include an identifier for the beacon, the user, the merchant, and/or a payment provider.

The user's device may be set up to passively monitor for BLE communications. When the device detects the signal and verifies the one or more identifiers, both the device and the beacon may ramp up in power and establish a connection, where the connection may further enable the device to communicate with the merchant and/or the payment provider. The beacon may be connected to a networked device at the merchant location, or the beacon may include network functionality to communicate with other devices and/or servers. Thus, the beacon enables the user's device to establish a connection, communicate check-in information (e.g., an identifier for the user), and/or complete a check-in with the merchant. The check-in may be completed automatically when the user's device is in range of the beacon, or may be completed after prompting the user to check-in when the user's device is in range of the beacon.

Once the merchant has established at least one wireless beacon at the drive through, the wireless beacon(s) may connect to the user's device when the device is in proximity to the wireless beacon(s). For example, a wireless beacon may broadcast the identifier that initiates a check-in within an area around the wireless beacon. Thus, as the user's device enters that area, the device may connect to the wireless beacon and/or initiate a check-in process. The wireless beacons may be range limited to correspond to a specific area of the merchant's drive through, such as an ordering intercom/menu and/or a specific lane of a multilane drive through. This may be done by adjusting the power of the signal emitted by the beacon so that devices outside of a radius surrounding the beacon will not pick up the identifier/check-in request and connect to the beacon. Thus, only devices in a certain range (e.g., a size of coverage for a vehicle detected by the merchant) may connect to the beacon. Moreover, the merchant may implement measures to limit the range of the wireless beacon, including placement of the wireless beacon and construction of the drive through. The beacon may further include directionality such that the beacon may connect to vehicle entering the drive through or section of the drive through, and disconnect as vehicles exit the drive through.

Once the user's device connects to the beacon, various transactions may be initiated, accessed, and/or completed using the device. For example, if the beacon is near a menu of available items for the merchant, the user may utilize the device to enter and submit an order. The wireless beacon may provide an interface for searching, selecting, and/or viewing the menu of available items and/or services. The device may display the order to the user and may update the order as the user adds, removes, and/or changes items/services in the order. Moreover, if the menu displayed in the drive through includes a nearby ordering intercom the user may submit items/services for the order using the intercom, which may be reflected on the device. Furthermore an ordering display device may be established in the drive through to display the order to the user and reflect changes made to the order by the user through the device. The display device may assist the merchant in accurately taking the order from the user. Thus, the order as seen to the merchant and displayed on the ordering display device may be matched with the order displayed to the user on the user's device. This allows the user (or other users in the vehicle) to submit orders using both the intercom and the user's device.

The wireless beacon may also connect with a plurality of users' devices. For example, a vehicle may include more than one user, each having their device (e.g., mobile phone). The vehicle may also have a main device, such as a heads up display or console computing system mounted inside the vehicle. The wireless beacon may display the order on each device and allow each device to edit the order. Thus, each user in the car may submit their own order and customize their items/services to their preferences. Additionally, changes to the orders may be reflected on each user's device as well as the ordering display device to insure accuracy of the order. To prevent devices in other vehicles or surrounding the vehicle from connecting to the wireless beacon, the merchant may detect a size and/or shape of the vehicle using sensors, weight sensors, cameras, or other devices. The size of the vehicle may affect a range that the wireless beacon may connect to devices (e.g., a range to transmit identifiers or other check-in requests).

Once an order is submitted to the merchant, the user or users may complete payment for the order using the device(s). Payment may be provided using a payment account with a payment provider or other payment instrument (e.g., cash, payment card, etc.). The wireless beacon may display a total to the user(s) through the device, where the user may select the payment instrument. If more than one user is submitting payment for the total (e.g., a split payment), each device for the user may be utilized to submit part of the payment. Moreover, each user may utilize their device to view their respective share of the total, such as by selecting items the user wishes to pay for or receiving their respective share from the merchant through the wireless beacon. Payment may be issued to the merchant through the wireless beacon or may be issued to the merchant over a network connection.

In certain embodiments, the order may be submitted by the user prior to arriving at the drive through. Thus, when the user's device connects to the wireless beacon, the order may be populated on the device and/or ordering display device in the drive through for editing and submission for preparation. In other embodiments, the common and/or past orders of the user may be presented to the user when the user arrives at the drive through so that the user may select to submit their "regular" order. The common and past order may be determined using an identifier of the user used in the past transactions or through transaction histories in a user/payment account of the user.

Figure 1:
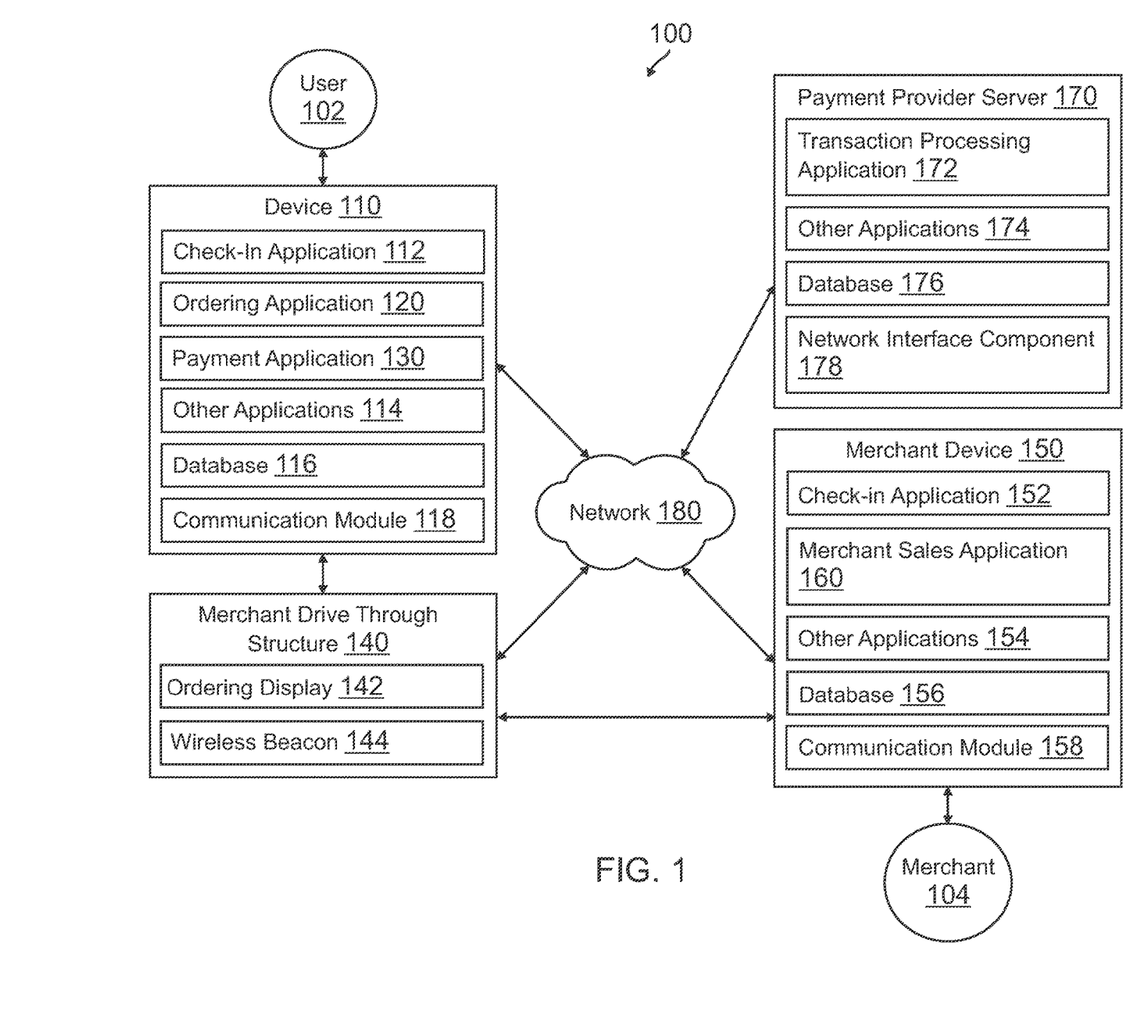
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a merchant 104 a device 110, a merchant drive through structure 140 having an ordering display 142 and a wireless beacon 144, a merchant device 150, and payment provider server 170 in communication over a network 180. User 102, such as a consumer or other potential purchaser, may arrive at a merchant location for merchant 104 that has a drive through. Device 110 may establish a connection with wireless beacon 144 at the drive through. User 102 may then submit an order for fulfillment to merchant 104 using device 110 over the connection between device 110 and wireless beacon 144. Additionally, payment provider server 170 may provide payment services between device 110 and merchant device 150.

Device 110, ordering display 142, wireless beacon 144, merchant device 150, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

Device 110 may be implemented using any appropriate hardware and software configured for wired and/or wireless communication with wireless beacon 144, merchant device 150, and/or payment provider server 170. For example, in one embodiment, device 110 may be implemented as a personal computer (PC), a smart phone, laptop computer, wristwatch with appropriate computer hardware resources, eyeglasses with appropriate computer hardware (e.g. GOOGLE GLASS®), or other wearable computing device, a computing device mounted within a vehicle (e.g., a console or heads up display computing device in a vehicle), and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

Device 110 of FIG. 1 contains a check-in application 112, an ordering application 120, a payment application 130, other applications 114, a database 116, and a communication module 118. Check-in application 112, ordering application 120, payment application 130, and other applications 114 may correspond to processes, procedures, and/or applications executable by a hardware processor, for example, a software program. In other embodiments, device 110 may include additional or different software as required.

Check-in application 112 may be used by user 102 of device 110 to establish a connection with wireless beacon 144, including a check-in with merchant 104. Check-in application 112 may correspond to a specific application utilized by device 110 with wireless beacon 144 and/or merchant device 150 to complete a check-in for a location corresponding to merchant 104. The check-in with merchant device 150 may correspond to a process to log in to a user account of user 102 with merchant device 150 (or payment provider server 170 if payment provider server 170 provides check-in services for merchant 104). In other embodiments, the check-in may provide and/or verify the identity of user 102, including transmission of an identifier for user 102 and/or device 110. The check-in may be completed over network 180 with merchant device 150. In such embodiments, check-in application 112 may correspond more generally to a browser application configured to communicate with merchant device 150 over a network connection (e.g., over a connection with network 180).

In various embodiments, check-in application 112 may also receive short range wireless communications from wireless beacon 144 at a location and transmit information to wireless beacon 144, including check-in information for a check-in process with merchant device 150 (or payment provider server 170 if payment provider server 170 provides check-in services for merchant 104) that associates user 102 with wireless beacon 144. For example, wireless beacon 144 may be located in a drive through for merchant 102 (e.g., at an entrance to a drive through lane, merchant menu display, ordering display, ordering window/intercom, etc.) where wireless beacon 144 is set up to communicate with device 110 when device 110 is in proximity to wireless beacon 144. Thus, wireless beacon 144 may be range limited to connect only with devices (e.g., device 110) within a specified area, such as a radius around wireless beacon 144, a distance away from wireless beacon 144, and/or a signal direction for wireless beacon 144. In various embodiments, wireless beacon 144 may connect to device 110 when device 110 is located in a vehicle that is currently located at a place for ordering from merchant 104 (e.g., a menu display, ordering display, and/or ordering window/intercom). Wireless beacon 144 may be set to be range limited using the construction of the drive through and/or wireless beacon 144. Wireless beacon 144 may also be range limited using the signal strength of wireless beacon 144, which may be adjusted as merchant 104 detects a size of the vehicle that device 110 is located in. Based on the proximity for connection to wireless beacon 144, check-in application 112 may transmit information to wireless beacon 144 when user 102 is nearby wireless beacon 144, enabling merchant device 150 to determine that user 102 is located in proximity to wireless beacon 144 (and thus may complete an order and payment to merchant 104).

Check-in application 112 may execute in the background of an operating system of device 110 and be configured to establish connections, using communication module 118 of device 110, with wireless beacon 144. The connection may be established with or without user input from user 102. For example, wireless beacon 144 may broadcast a token, such as a universally unique identifier (UUID), for reception by check-in application 112, as will be explained in more detail herein. Check-in application 112 may utilize communication module 118 of device 110 to receive the token from wireless beacon 144. If check-in application 112 acknowledges the UUID as identifying wireless beacon 144, merchant device 150, and/or payment provider server 170 (e.g., if check-in application 112 determines the UUID corresponds to a request to establish a communication channel and/or process and complete a check-in), check-in application 112 may transmit an identifier corresponding to user 102 and/or device 110 back to wireless beacon 144. Check-in application 112 may utilize communication module 118 of device 110 to communicate with wireless beacon 144 (e.g., over near field communication, Bluetooth, Bluetooth Low Energy, radio, infrared, LTE Direct, or other communication protocol). The identifier from device 110 may include, be transmitted with, concatenated with, or otherwise bundled with the identifier received from wireless beacon 144. In other embodiments, different information may be transmitted to wireless beacon 144, such as an identifier for user 102, a name or other personal information for user 102, an identifier used to recall or determine a previously submitted order by user 102, and/or information used to determine previous or common orders for user 102. Thus, the information transmitted to wireless beacon 144 does not need to be utilized to process and/or complete a check-in with merchant device 150 in all embodiments.

Once a connection is established with wireless beacon 144, device 110 may be checked-in with merchant device 150 if user 102 has not previously been checked-in. The check-in process may then associate user 102 with wireless beacon 144 used to connect to device 110. For example, merchant 104 may previously have registered wireless beacon 144 as located in the drive through and at a location used to submit orders for fulfillment by merchant 104. Thus, merchant 104 is informed that user 102 is in the drive through and ready to order from merchant 104. Merchant 104 may further determine that a vehicle for user 102 is in the drive through and detect a size for the vehicle, as will be explained in more detail herein. Thus, any other device in proximity to wireless beacon 144 (e.g., capable of connecting to wireless beacon 144) may be determined to be located in the vehicle for user 102 and associated with user 102. Thus, those devices may be further associated with the order submitted to merchant 104. As previously discussed, in other embodiments, a check-in need not be processed and/or completed to associate user 102 with the drive through. Thus, other connections and data transfers to wireless beacon 144 may be sufficient to associate user 102 with the drive through.

Ordering application 120 may correspond to, in various embodiments, an application that allows user 102 to view menu items/services available from merchant 104 and submit an order for selected items/service to merchant 104 for fulfillment. Thus, ordering application 120 may receive information from merchant device 150 (e.g., from wireless beacon 144 connected to with merchant device 150 and/or over network 180 from merchant device 150). Information received from merchant device 150 may include menu information for items and/or services available from merchant 104. For example, where merchant 104 is a fast food merchant with a drive through having wireless beacon 144, menu information may display a list of food and drink items available from merchant 104 as well as price information, ingredients, nutritional information, options/customizations for the food/drink items, etc. Once device 110 is connected to wireless beacon 144, the menu item may be populated to ordering application 120 so that user 102 may select food and drink items for purchase and submit an order for selected items. In other embodiments, the menu may be accessible from merchant device 150 over network 180. The menu may be displayed as an interactive menu allowing user 102 to browse, navigate and search for items/services available from merchant 104 while generating, editing, and submitting an order. In various embodiments, menu information may correspond to more general information of items and/or services available from merchant 104, such as prescription medication submissions, pick-up times, refills, etc., banking information, balances, etc., and/or available services (e.g., oil change, car wash, etc.).

If other users are associated with user 102 and ordering at the same time (e.g., friends, coworkers, and/or family members in the same vehicle as user 102 while creating and submitting an order for fulfillment by user 102), the other users may also possess devices that include a check-in application, an ordering application, and/or a payment application. Thus, the other users may utilize their respective devices to select, edit, and submit items/services for purchase in the same order with user 102. User 102 may therefore view selected items/services by the other users in the order using ordering application 120 as well as a total including cost, tax, tip, and/or service charge for those items. In various embodiments, user 102 may add, remove, and/or customize the items/services submitted by the other users. For example, user 102 and the other users may all be given access rights to the order to generate and edit the order as user 102 and the other users see fit. In certain embodiments, user 102 or another user may be given priority access rights to have a final determination of the order, such as a parent in a car full of children. However, in other embodiments, user 102 may be given no rights to access, edit, and submit items/services selected by another user in an order (e.g., in a car full of coworkers where each coworker has final say in their order). Such access rights may be determined at the time of connection of device 110 and the other user's device to wireless beacon 144 or may be set by user account credentials, based on past transactions for each user, or based on user device relationships (e.g., if two devices are associated on a similar plan and one is noted as a device of a child for the parent's device on the plan, if two devices co-located or perform transactions together frequently, etc.).

Ordering application 120 may also display common, regular and/or past orders for user 102 and/or other users associated with user 102 (e.g., users in a vehicle with user 102 while ordering from merchant 104, children of user 102, friends/family of user 102, or other associated users). These regular and/or past orders may be determined using user information for user 102 and/or the other users, such as a user identifier, name, payment card/account information, etc., as will be explained in more detail herein. The regular/past orders may also be set by the user, such as by user 102 selecting a "favorite" option or feature when using ordering application 120. User 102 may utilize ordering application 120 to select, view, edit (e.g., add, remove, and/or customize the items/services in the order), and/or submit one or more of the regular/past orders. Additionally, the other users may similarly select, edit, and submit the regular/past orders as their order using their respective user devices, which may appear to user 102 on a user interface of ordering application 120, as previously discussed. The regular/past orders of the other users may similarly be populated to ordering application 120 and/or the devices of the other users.

In various embodiments, user 102 may receive rewards, discounts, and/or loyalty benefits for use with merchant 104. For example, user 102 may have discounts, such as 20% off offers, that user 102 may apply to an order. Such discounts may be entered and/or accessible by user 102 using ordering application 120. Ordering application 120 may transmit the coupons to merchant device 150 for application to an order. In other embodiments, user 102 may also physically present the discount to merchant 104 and/or merchant device 150 to receive the discount. In additional embodiments, user 102 may receive rewards from previous purchases from merchant 104. In such embodiments, user 102 may receive a discount based on a previous purchase, such as a discount incentive to receive further business from user 102. Thus, such a reward may correspond to a free soda at a next visit. These rewards may be stored to a loyalty account for user 102, and may further be stored and/or accessible by ordering application 120. Similarly, ordering application 120 and/or user 102 may present the rewards to merchant 104 when submitting an order for purchase.

In various embodiments, user 102 may utilize ordering application 120 to determine an order for pick-up from merchant 104's drive through prior to user 102 arriving at the drive through. For example, user 102 may select an order for pick-up prior to leaving an office for user 102 and then drive to the merchant location for merchant 104. Thus, menu information for merchant 104 may be received over network 180 prior to arrival at the drive through. User 102 may utilize this menu information to create and submit an order to merchant 104, as previously discussed. When user 102 connects to wireless beacon 144, the previously submitted order may be recalled and displayed to user 102 on a display interface of ordering application 120. In various embodiments, user 102 may review, edit, and approve the order for fulfillment by merchant 104. Additionally, user 102 may provide payment for the order prior to arrival at the merchant location for merchant 104 (e.g., prior to connecting to wireless beacon 144 in the drive through), or when approving the order while connected to wireless beacon 144.

In various embodiments, orders may be submitted to merchant 104 and order details may also be displayed to user 102 using ordering display 142 of merchant drive through structure 140, as will be explained in more detail herein. Once an order is submitted to merchant 104, payment may be required for the order. Thus, ordering application may also display a total, including tax, tip, and/or service charge, for processing and payment. Additionally, ordering application 120 may display an amount for each item/service, including the item's pro-rata portion of the tax, tip, and/or service charge. If other users have submitted items/services in an order using their user device, the items/service submitted by each user may be sectionalized to determine those items/services portion of the payment total, including the pro-rata portion of the tax, tip, and/or service charge owed by each user's order. Payment may be provided to merchant 104 using cash, a payment card, or a payment account with a payment provider. Thus, in various embodiments, payment application 130 may be utilized to process and provide payment to merchant 104.

Payment application 130 may be used, for example, to provide a convenient interface to permit user 102 to select payment options and provide payment for items and/or services. For example, payment application 130 may be implemented as an application having a user interface enabling the user to enter payment options for storage by device 110, provide payment to merchant 104, and complete a transaction for the items and/or services using payment provider server 170. Payment application 130 may be configured to provide payment to merchant 104. In this regard, payment application 130 may correspond to an application that may provide an interface where user 102 may view an order for items/services submitted by user 102. Additionally, user 102 may generate a payment request for the order to merchant 104. The payment request may instruct payment provider server 170 to provide payment for the order to merchant 104. Additionally, the payment request may include identification of a payment instrument that payment provider server 170 may utilize to provide the payment to merchant 104. Payment application 130 may correspond to a dedicated application for payment provider server 170 (e.g., a specific device application) or may correspond to a browser application configured to view information available over the Internet or access a website corresponding to a payment provider.

The payment request may correspond to a token generated by payment application 130 including a payment amount and a selected payment instrument for user 102. As previously discussed, the payment amount may correspond to a complete amount for the total for the order or a partial amount of the total for the order. For example, if user 102 is the only party ordering in one instance from merchant 104 or user 102 is providing payment for all parties ordering from merchant 104 during the instance, the payment amount may include the total due to merchant 104. However, in other embodiments, one or more other users may split the total due for the order with user 102. Thus, the payment amount may correspond to the amount user 102 has agreed to pay for the total for the order (e.g., a selected amount or an amount due for the items/services requested by the user).

The payment instrument may correspond to an account identifier, payment card, bank account, etc. Once the payment request is generated, user 102 may authorize the payment request for transmission to payment provider server 170 in order to effectuate a payment to merchant 104. User device 140 may transmit the payment request to payment provider server 170 with an identifier for merchant 104 in order to complete the payment to merchant 104. In other embodiments, payment application 130 may transmit the payment request as a token with a payment instrument and identifier for user 102 to merchant device 150 for completion by merchant 104. If the payment amount is a partial amount due for the total (e.g., a split of the total with other users in the vehicle with user 102), the token may be transmitted to merchant device 150 or payment provider server 170 separately from the payment tokens due by the other users or bundled with the payment tokens of the other users.

Payment application 130 may provide payment for items using a user account with the payment provider, such as payment provider server 170. Payment application 130 may include cross-linking, allowing user 102 to identify a user account through an identifier for a separate user account (e.g. identifying a user account through a debit card account number and vice versa). Payment application 130 may further include options to store transaction histories for purchased items, such as receipts, for later use. Thus, payment application 130 provides an interface enabling user 102 to provide proof of purchase to merchant 104.

In various embodiments, one or more features of check-in application 112, ordering application 120, and/or payment application 130 may be incorporated in the same application so as to provide their respective features in one application.

Device 110 includes other applications 114 as may be desired in particular embodiments to provide features to device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with payment provider server 170. Other applications 114 may include browser, social networking, and/or mapping applications, which may also be used in conjunction with check-in application 112, ordering application 120, and/or payment application 130. Other applications 114 may contain software programs, executable by a processor, including a graphical user interface (GUI) configured to provide an interface to the user.

Device 110 may further include database 116 which may include, for example, identifiers such as operating system registry entries, cookies associated with check-in application 112, ordering application 120, payment application 130, and/or other applications 114, identifiers associated with hardware of device 110, or other appropriate identifiers, such as identifiers used for payment/user/device authentication or identification. Identifiers in database 116 may be used by a payment/credit provider, such as payment provider server 170, to associate device 110 with a particular account maintained by the payment/credit provider. Database 116 may include user device tokens and/or encryption keys, including an encryption key of wireless beacon 144, merchant device 150, and/or payment provider server 170. Database 116 may include identifying information for tokens enabling check-in application 112 to identify wireless beacon 144, merchant device 150, and/or payment provider server 170 when receiving a corresponding check-in token. Additionally, database 116 may include data received by ordering application 120 and/or payment application 130, including menu information, merchant information, and/or payment and transaction history information.

Device 110 includes at least one communication module 118 adapted to communicate with wireless beacon 144, merchant device 150, and/or payment provider server 170. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 144 using short range communications, such as Bluetooth Low Energy, LTE Direct, WiFi, radio frequency, infrared, Bluetooth, and near field communications.

Merchant drive through structure 140 may be implemented as a physical structure at a merchant location for merchant 104, such as located in, near, or corresponding to a drive through for the merchant location. In this regard, merchant drive through structure 140 may include physical displays having information of items and/or services available from merchant 104. Merchant drive through structure 140 may include a physical display having the menu information for the items/service, prices for the items/service, components of the items/services (e.g., ingredients, contents, etc.), and/or customization options for the items/services. The information displayed by merchant drive through structure 140 may be utilized by user 102 to generate, select, and submit an order having items/services for fulfillment by merchant 104. Although only one structure is shown, the merchant location may utilize a plurality of similar structures, for example, in separate lanes of a multilane drive through or in separate locations of the drive through.

Merchant drive through structure 140 of FIG. 1 further includes an ordering display 142 and a wireless beacon 144. Ordering display 142 and wireless beacon 144 may include hardware and software necessary to execute the processes and functions as described below. In other embodiments, merchant drive through structure 140 may include displays, hardware, and/or software as required.

Ordering display 142 may, in various embodiments, correspond to a visual display device such as a CRT, LED, LCD, plasma, or other display device configured to display order details to user 102. Thus, ordering display 142 may further include necessary hardware and/or software to receive order details from device 110 and/or merchant device 150 and display the order details to user 102 on a display screen. As previously discussed, order details may include items/services requested by user 102, modifications to the items/services (e.g., customizations including adding and removing ingredients), prices for individual items/services, an overall total for the items/services in the order, and/or other costs (e.g., tax, tip, and/or service charges). Thus, ordering display 142 may display the aforementioned information included in the order to user 102. As the aforementioned information may also be displayed to user 102 in ordering application 120, ordering display 142 may be synchronized with the order in ordering application 120 to reflect additions, changes, and deletions from the order.

In various embodiments, ordering display 142 may include an intercom, microphone, or other input/output device or system (including a staff member of merchant 104 receiving voice requests by user 102 and utilizing an input/output device to enter the voice requests as requested items/services input for an order) where user 102 may submit requested items/services. For example, user 102 may make voice requests at ordering display 142 that may add, update, change, and/or remove items/services from an order. Such voice requests may be reflected in the order and order details displayed to user 102 in an application interface of ordering application 120. Additionally, the voice requests may update the order and order details displayed on ordering display 142. Thus, ordering display 142 may be utilized to provide orders to merchant 104, for example, where user 102 is driving an older or "classic" car. In such embodiments, ordering application 120 may not be utilized to provide the order to merchant 104, and instead user 102 may submit the order using the intercom. User device 110 may also provide payment for the order, such as by receiving a payment request token from merchant device 150 through wireless beacon 144, completing a payment for the payment request in the received token using payment provider server 170, and providing proof of payment to merchant 104 at a check-out and pick-up window. Proof of payment may be provided, in various embodiments, through a transaction history, identification number, or other receipt or payment documentation.

Wireless beacon 144 may be maintained, for example, by merchant 104 and/or payment provider server 170. Wireless beacon 144 may be implemented using any appropriate hardware and software configured for wireless communication with device 110. For example, in one embodiment, wireless beacon 144 may be implemented as a dongle device including a hardware processor and a communication module, for example, connected to device at the location of merchant 104. Wireless beacon 144 may also be implemented as devices incorporated within a personal computer (PC), a smart phone, laptop computer, and/or other types of computing devices capable of transmitting and/or receiving data, such as an IPAD® from APPLE®. Wireless beacon 144 may also act as a stand-alone device including a processor, communication module, and/or network interface component configured to communicate with device 110 and/or payment provider server 170. Although wireless beacon 144 is described singly, a plurality of wireless beacons may be set up at a drive through of merchant 104, such as in various lanes of a multilane drive through or at various locations in the drive through.

Wireless beacon 144 may be located at a physical location corresponding to merchant 104. A physical location corresponding to merchant 104 may constitute a drive through and more specifically to merchant drive through structure 140. For example, wireless beacon 144 may be established at merchant drive through structure 140, including nearby ordering display 142. Wireless beacon 144 may be limited, either by signal range or physical boundaries, to merchant drive through structure 140 and/or an area corresponding to merchant drive through structure 140.

Wireless beacon 144 of FIG. 1 contains processes, procedures, and/or applications executable by a hardware processor, for example, a software program, configured to interact with device 110, merchant device 150, and/or payment provider server 170. Thus, regardless of the implementation of wireless beacon 144 as discussed above, wireless beacon 144 may utilize a connection/check-in process and include or be connected to a communication module. In other embodiments, wireless beacon 144 may include additional or different hardware and software as required.

Wireless beacon 144 may include an application for transmitting requests to establish a connection between a device (e.g., device 110) and wireless beacon 144. The requests may be unique to wireless beacon 144, thereby identifying wireless beacon 144. Wireless beacon 144 may utilize short range wireless communications of wireless beacon 144 to transmit the requests to establish a connection, including an identifier such as a Universally Unique Identifier (UUID). If device 110 receives a request to establish the connection with wireless beacon 144 and responds with an identifier for user 102/device 110 (potentially including the UUID and other information necessary to effectuate a check-in for user 102), wireless beacon 144 to ramp up in power and create a connection between device 110 and wireless beacon 144.

Wireless beacon 144 may transmit the request to establish the connection with wireless beacon 144 as a short range wireless communication (e.g. a BLE protocol communication) including a "wake up" process for check-in application 112 of device 110 and/or a token for wireless beacon 144 transmitting the request. In other embodiments, the request and/or connection may utilize near field communication, radio communication, infrared communication, or Bluetooth communication. Additionally, although wireless beacon 144 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 144 (e.g., device 110 and/or merchant device 150) and establishment of a connection for data transfers. In other embodiments, wireless beacon 144 may correspond to other devices, such as WiFi capable devices, near field communication devices, etc.

The request may be specific to device 110 by including information that is specific to user 102, such as a name, identifier, or user device identifier. The information specific to user 102 may be determined from a user account of user 102 or other information previously provided to merchant device 150 and/or payment provider server 170 (e.g., an identifier for user 102 provided to merchant device 150 and/or payment provider server 170). Thus, in certain embodiments, only device 110 will pick up and authenticate the request, for example, if user 102 has previously submitted an order and merchant 104 is expecting user 102 to arrive. In other embodiments, only device 110 (and devices in the same vehicle as device 110) may pick up the request if wireless beacon 144 is ranged limited to only transmit the request to devices within an area for a vehicle in proximity to wireless beacon 144. The range limitation of wireless beacon 144 may be fixed or may be determined based on an approximate vehicle size detected by merchant 104 (e.g., using merchant device 150 and/or scales, cameras, sensor devices, etc.). For example, one of wireless beacon 144 established at merchant drive through structure 140 may be limited in range only to connect to device 110 if device 110 is located in proximity merchant drive through structure 140.

After wireless beacon 144 receives an identifier from device 110, wireless beacon 144 may determine user 102 is in proximity to wireless beacon 144. If identifiers are received from other users' devices while wireless beacon 144 is range limited to an area or vehicle size corresponding to user 102, wireless beacon 144 may further determine those devices are in the same vehicle or area as user 102 and correspondingly connect to those devices. Wireless beacon 144 may pass the identifier (and any other device's identifiers where applicable) to merchant device 150 and/or payment provider server 170 to associate user 102 (and the other users where applicable) with the wireless beacon 144. By associating user 102 with wireless beacon 144, merchant device 150 and/or payment provider server 170 may determine user 102 (and the other users where applicable) is located at merchant drive through structure 140 and is ready to generate and submit an order to merchant 104.

Wireless beacon 144 may utilize a communication module to pass the identifier to merchant device 150, which may then pass the identifier to payment provider server 170. However, in other embodiments, wireless beacon 144 may utilize a network connection of wireless beacon 144 to pass the identifier to payment provider server 170 directly. Thus, wireless beacon 144 includes a communication module adapted to communicate with device 110, merchant device 150, and/or payment provider server 170. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 144 may also communicate with device 110 and/or merchant device 150 using short range communications, such as Bluetooth Low Energy, LTE Direct, WiFi, radio frequency, infrared, Bluetooth, and near field communications.

Merchant device 150 may correspond to a device used by merchant 104 to view, process, and complete financial transactions for orders submitted by user 102. Thus, merchant device 150 may be located locally to a merchant location for merchant 104, such as at a drive through window or station of a drive through at the merchant location. However, merchant device 150 may also function remotely to the merchant location and interact with merchant 104 and/or merchant representatives for merchant 104 at the merchant location. Merchant device 150 may be implemented using any appropriate hardware and software configured for wired and/or wireless communication with device 110, wireless beacon 144, and/or payment provider server 170. For example, merchant device 150 may be implemented as a personal computer (PC), a smart phone, laptop computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 150 may be included in payment provider server 170 (e.g., check-in application 152 where check-in services are offered to merchant 104 through payment provider server 170), and vice versa.

Merchant device 150 of FIG. 1 contains a check-in application 152, a merchant sales application 160, other applications 154, a database 156, and a communication module 158. Check-in application 152, merchant sales application 160, and other applications 154 may correspond to processes, procedures, and/or applications executable by a hardware processor, for example, a software program. In other embodiments, merchant device 150 may include additional or different software as required.

Check-in application 152 may correspond to processes to complete check-in with device 110 for a location corresponding to merchant 104 (e.g., with one or more of wireless beacon 144 established in a merchant location for merchant 104). Thus, check-in application 152 may correspond to the merchant device side application configured to receive check-in information from device 110 and complete the check-in. The check-in request may include log in information for a user account with merchant 104 and/or payment provider server 170 and thus complete the check-in with user 102 by verifying the account information. For example, the check-in information may include an identifier or other account information for a user/payment account of user 102. However, in embodiments where a user account has not been previously established by user 102, check-in application 152 may receive other information identifying user 102, including a user name/identifier, user device identifier, an identifier for an account with another server, or other information. Such information may also be used to identify past transactions of user 102 with merchant 104. The check-in information may also be utilized to pull up a previous order submitted by user 102 and complete a transaction for the order. For example, the check-in information may include an identifier for user 102 that enables merchant device 150 to identify a food order, prescription, or other requested order submitted by user 102 prior to device 110 connecting to wireless beacon 144, a submitted. The identifier received by check-in application 152 from device 110 may also be associated with an order submitted by user 102 while connected to wireless beacon 144 allowing payment and recall of the order when necessary.

Once a connection is established and/or a check-in is completed between device 110 and wireless beacon 144, merchant sales application 160 may be utilized to transmit and receive information between device 110 and merchant device 150. Merchant sales application 160 may provide information for available items and/or services to device 110 and receive an order submitted by user 102, as previously discussed. Merchant sales application 160 may also be configured to answer queries for information (in some cases using input by merchant 104), provide order limitations, and/or update the information for the available items/services (e.g., menu updates including available menu items/services). Thus, merchant sales application 160 may be configured to provide menu options to user 102 based on information available for merchant 104.

Merchant sales application 160 may also be utilized to, for example, provide a convenient interface to permit merchant 104 to view a submitted order, approve the submitted order, and complete a transaction for the submitted order (e.g., receive payment for the order). In this regard, merchant sales application 160 may display the order to merchant 104 so that merchant 104 may confirm the order. If items and/or services cannot be fulfilled in the order, merchant sales application 160 may also be utilized to notify user 102 and/or edit the order. Once the order is approved by merchant 104, merchant sales application 160 may be utilized to request payment for the order. Payment for the order may include a request to pay a total for the order, including tax, tip, and/or service charges. As previously discussed, multiple users (e.g., user 102 and other users) may submit different items/services in an order using their respective devices. Thus, using the identifiers for each device connected to wireless beacon 144 and the items/services selected by each device, merchant sales application 160 may keep each user's requested items/services separate and determine their totals for display to each individual user.

Merchant sales application 160 may present the total for the order and any requested split totals for the amounts due by each person. The split amounts due by each person may be displayed to all users on all the devices, or each specific user on their device using the identifier for the device that is associated with their split total. Moreover, merchant sales application 160 may also receive different split totals from user 102 and the other users, for example by each user selecting either a partial amount of the total to pay, or selecting specific items/services in the order to pay. Merchant sales application 160 may calculate each user's prorata portion of tax, tip, and/or service charge, or may accept each user's selection of a partial amount of the tax, tip, and/or service charge to pay.

Merchant sales application 160 may receive payment for the total from device 110, the other users' devices, and/or payment provider server 170. In various embodiments, merchant 104 may also receive physical payment instruments, such as cash and/or payment cards from user 102 and/or the other users, in order to pay for partial amounts of the total. Thus, merchant sales application 160 may also be utilized to run payment cards, complete cash transactions, and/or otherwise complete payment for the order. Once payment for the order is complete, merchant sales application 160 may be configured to generate a transaction history for the order, including an overall receipt, receipt for partial amounts, and/or confirmation of payment(s). The transaction history and/or receipts may be provided electronically to user 102 and/or the other users through wireless beacon 144 and/or network 180, or a physical copy of the transaction history and/or receipts may be provided.

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 180, or other types of applications. In various embodiments, other applications 154 may include financial applications, such as banking, online payments, money transfer, or other applications associated with payment provider server 170. Other applications 154 may contain other software programs, executable by a processor, including a graphical user interface (GUI) configured to provide an interface to the user.

Merchant device 150 may further include database 156 which may include, for example, identifiers such as operating system registry entries, cookies associated with check-in application 152, merchant sales application 160, and/or other applications 154, identifiers associated with hardware of merchant device 150, or other appropriate identifiers, such as identifiers used for payment/user/device authentication or identification. In one embodiment, identifiers in database 156 may be used by payment provider server 170 to associate merchant device 150 with a particular account maintained by payment provider server 170. Database 156 may also store user 102's information, including check-in information, an identifier, etc., for user 102, and any other users associated with user 102 while ordering with user 102. Database 156 may include orders by user 102 and transaction histories for purchased items by user 102 to present proof of purchase. Merchant information, such as menu information of available items/services, may also be stored to database 156.

Merchant device 150 includes at least one communication module 158 adapted to communicate with device 110, wireless beacon 144, and/or payment provider server 170. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 158 may communicate directly with wireless beacon 144 using short range communications, such as Bluetooth Low Energy, LTE Direct, radio frequency, infrared, Bluetooth, and near field communications.

Payment provider server 170 may be maintained, for example, by an online payment service provider, which may provide payment services and/or processing for financial transactions on behalf of a user. In this regard, payment provider server 170 includes one or more processing applications which may be configured to interact with device 110, wireless beacon 144, and/or merchant device 150 to facilitate payment for a transaction. In one example, payment provider server 170 may be provided by PAYPAL®, Inc. of San Jose, Calif., USA. However, in other embodiments, payment provider server 170 may be maintained by or include a credit provider, financial services provider, financial data provider, and/or other service provider, which may provide payment services to user 102 and/or merchant 104. Moreover, in various embodiments, one or more of the applications, processes, and/or features discussed below in reference to payment provider server 170 may be included in merchant device 150, and vice versa.

Payment provider server 170 of FIG. 1 includes a transaction processing application 172, other applications 174, a database 176, and a network interface component 178. Transaction processing application 172 and other applications 174 may correspond to processes, procedures, and/or applications executable by a hardware processor, for example, a software program. In other embodiments, payment provider server 170 may include additional or different software as required, such as a check-in application as discussed in reference to merchant device 150, where such check-in processes and features are instead provided by payment provider server 170.

Transaction processing application 172 may be configured to receive information from and/or transmit information to device 110 and/or merchant device 150 for processing and completion of financial transactions. Transaction processing application 172 may include one or more applications to process financial transaction information from user 102 and merchant 104 by receiving a request to complete transaction for items and/or services offered by merchant 104. The request may correspond to a payment from user 102 to merchant 104. The payment may include a user account identifier or other payment information (e.g. a credit/debit card or checking account) for user 102 and a receiving account for merchant 104. Additionally, the payment may include a payment amount and terms of payment. The payment amount may constitute the entire total for an order submitted by user 102, or a partial amount of the total during a split payment transaction, as previously discussed. Transaction processing application 172 may complete the transaction by providing payment to merchant 104 through merchant 104's account/payment information. Additionally, transaction processing application 172 may provide transaction histories, including receipts, to device 110 and/or merchant device 150 for completion and documentation of the financial transaction. For example, a transaction history may be provided to device 110 and/or merchant device 150 to allow for merchant 104 to view the transaction and provide the items and/or services to user 102.

In various embodiments, payment provider server 170 includes other applications 174 as may be desired in particular embodiments to provide features to payment provider server 170. For example, other applications 174 may include security applications for implementing server-side security features, programmatic server applications for interfacing with appropriate application programming interfaces (APIs) over network 180, or other types of applications. Other applications 174 may contain software programs, executable by a processor, including a graphical user interface (GUI), configured to provide an interface to a user.

Additionally, payment provider server 170 includes database 176. As previously discussed, user 102 and/or merchant 104 may establish one or more payment accounts with payment provider server 170. User accounts in database 176 may include merchant/user information, such as name, address, birthdate, payment/funding information, additional user financial information, and/or other desired user data. User 102 and/or merchant 104 may link to their respective payment accounts through a user, merchant, and/or device identifier. Thus, when an identifier is transmitted to payment provider server 170, e.g. from device 110 and/or merchant device 150, a payment account belonging to user 102 and/or merchant 104 may be found. In other embodiments, user 102 and/or merchant 104 may not have previously established a payment account and may provide other financial information to payment provider server 170 to complete financial transactions, as previously discussed. Database 176 may further include additional information received from device 110 and/or merchant device 150, such as check-in information and identifiers, merchant 104's information including menu information, and transaction information for user 102 and merchant 104.

In various embodiments, payment provider server 170 includes at least one network interface component 178 adapted to communicate device 110, wireless beacon 144, and/or merchant device 150 over network 180. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
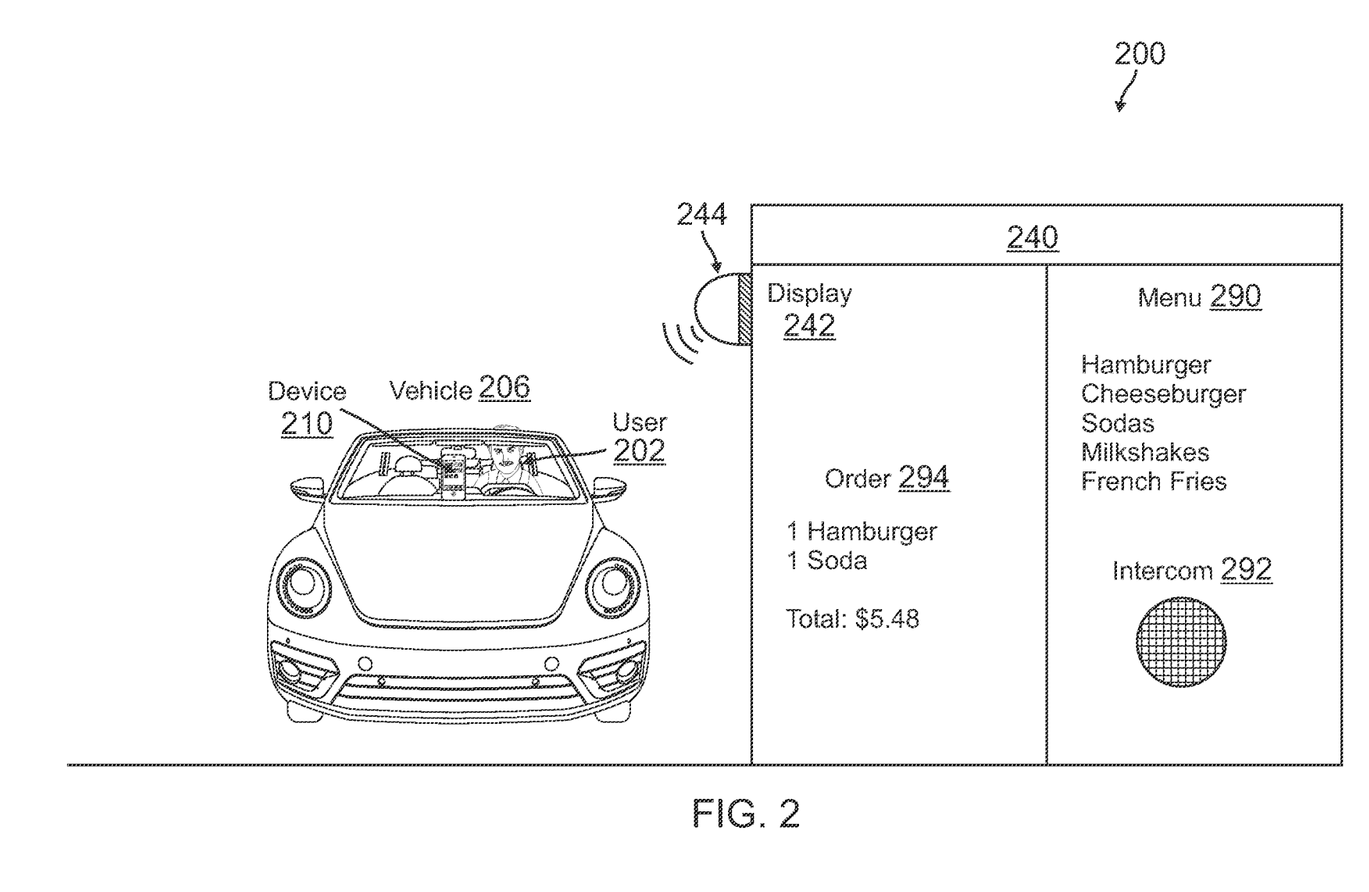
FIG. 2 is an exemplary environment with a user in a vehicle utilizing a wireless beacon to order and pay for items and/or services available from a merchant, according to an embodiment.

FIG. 2 is an exemplary environment with a user in a vehicle utilizing a wireless beacon to order and pay for items and/or services available from a merchant, according to an embodiment. Environment 200 of FIG. 2 includes a user 202 and a device 210 corresponding generally to user 102 and device 110, respectively, of FIG. 1. Additionally, environment 200 includes a merchant drive through structure 240 with an ordering display 242 and a wireless beacon 244 corresponding generally to merchant drive through structure 140, ordering display 142, and wireless beacon 144, respectively, of FIG. 1.

As shown in environment 200, user 202 arrives at a drive through for a merchant (e.g., merchant 104, not shown) in a vehicle 206. User 202 further has device 210 inside vehicle 206. Device 210 may correspond to a user device, such as a mobile phone, wearable computing device, tablet computer, etc. Additionally, device 210 may correspond to a computing device attached or connected to vehicle 206, such as a heads up display computing device, console computing device, etc. Thus, when user 202 arrives at the drive through and device 210 is within range of wireless beacon 244, device 210 and wireless beacon 244 may establish a connection for purposes of completing an order and payment to the merchant. As previously discussed, when device 210 connects to wireless beacon 244, the merchant may detect a size, shape, or other approximate area coverage of vehicle 206 and adjust the connectivity range of wireless beacon 244 (e.g., the range of signals emitted by wireless beacon 244). Therefore, any other devices in vehicle 206 that also connects to wireless beacon 244 may be determined to be within vehicle 206 and may be associated with user 202, vehicle 206, and device 210, as well as the order submitted while device 210 is within range of wireless beacon 244.

While located at merchant drive through structure 240, user 202 may view items and/or services offered for sale from the merchant. Thus, merchant drive through structure 240 includes a menu 290 listing available food items from the merchant for FIG. 2. Items and/or services available under menu 290 may also populate on device 210 through communications received over a network connection or over a connection with wireless beacon 244. When viewing the items available from the merchant under menu 290, user 202 may form an order and submit the order to the merchant using device 210. However, user 202 may also order, cancel, change, or modify an order (e.g., items and/or services request in an order) though an intercom 292. Intercom 292 may be connected to a merchant audio or audiovisual device that enables the merchant to receive voice instructions from user 202 for an order and enter the instructions into the order. Once items and/or services are ordered by user 202, they may appear under ordering display 242, for example, as order 294. Thus, as shown in environment 200, user 202 has ordered a hamburger and a soda, and has a total of $5.48. In various embodiments, order 294 may also appear on device 210 to user 202 so that user 202 may view order 294 and make additions, deletions, and changes.

Figure 3:
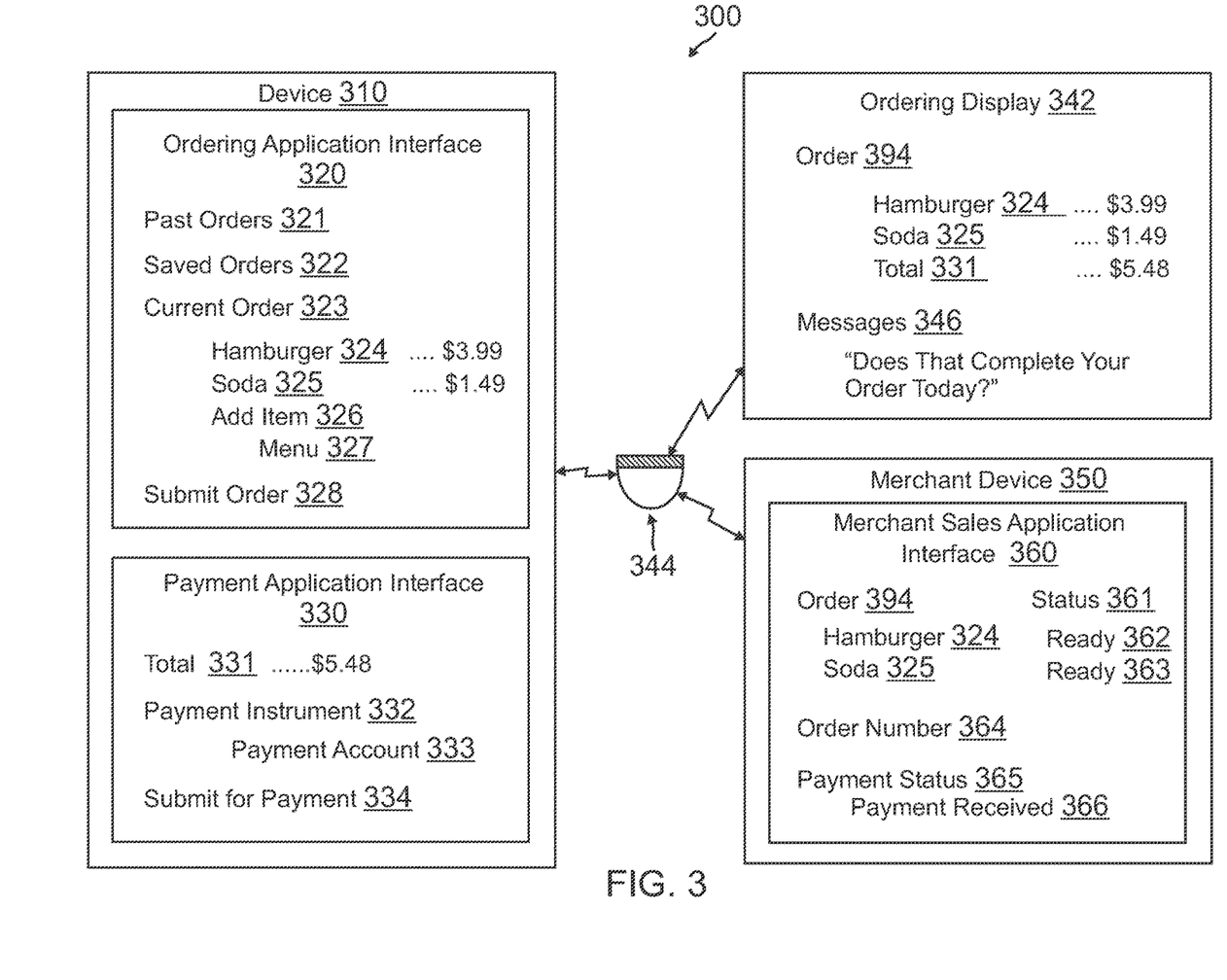
FIG. 3 is an exemplary system environment showing display screens for a user's device and a merchant device interacting through a wireless beacon to complete orders with a merchant, according to an embodiment.

FIG. 3 is an exemplary system environment showing display screens for a user's device and a merchant device interacting through a wireless beacon to complete orders with a merchant, according to an embodiment. Environment 300 of FIG. 3 includes a device 310, an ordering display 342, a wireless beacon 344, and a merchant device 350 corresponding generally to device 110, ordering displays 142, wireless beacon 144, and merchant device 150, respectively, of FIG. 1.

User device 310 displays an ordering application interface 320 corresponding generally to the processes and features described in reference to ordering application 120 of FIG. 1. Ordering application interface 320 includes past orders 321, saved orders 322, a current order 323, and a submit order 328 option. Ordering application interface 320 may correspond to an interactive graphical user interface whereby a user (not shown) of user device 310 may make selections of items and/or services available from a merchant (not shown). Thus, ordering application interface 320 may display a menu of items/services available from the merchant and/or enable selection, browsing, and/or searching for items/services available from the merchant. Information displayed in ordering application interface 320 may be received from wireless beacon 344 or, in various embodiments, over a network connection of device 310 (e.g., from a source over the Internet).

The user may view past orders 321, which may include orders previously submitted and/or fulfilled by the merchant. Past orders 321 may be determined using a user account for the user of device 310. Additionally, the merchant and/or merchant device 350 may determine past orders 321 after an identifier is transmitted to wireless beacon 344. Once orders previously submitted to the merchant are determined for the user of device 310, they may be transmitted to and/or stored by device 310 for display to the user in ordering application interface 320. Similarly, saved order 322 may be determined for the user from a user account and/or identifier for the user or device 310. Saved orders 322 may correspond to orders that the user has elected to store for later recall. For example, one or more of past orders 321 and saved orders 322 may correspond to a "favorite" or "regular" order that the user may later purchase again. This enables easy recall and selection of an order to merchant device 350.

Current order 323 may include a present order for the user of device 310 that the user currently wishes to submit to the merchant of merchant device 350 and purchase. Current order 323 may be determined by selecting items/services available from the merchant while searching/browsing a menu of available items/services. For example, the menu of available items/service may appear under a tab or as an interactive display screen in ordering application interface 320. Additionally, a search box or other browsing tools may also be displayed to the user to allow the user to find items/services. Thus, the user may make selections of desired items/services, which may then appear under current order 323, allowing the user to create and view an order. In other embodiments, the user may make a selection of one or more orders viewable in past orders 321 and/or current orders 322.

As shown in environment 300, current order 323 includes a hamburger 324, a soda 325, as well as an add item 326 option and menu 327 information. Thus, the user of device 310 has placed hamburger 324 and soda 325 in an order that the user may submit to the merchant of merchant device 350. Additionally, the user may edit, add, and/or remove items from current order 323. For example, selection of hamburger 324 and/or soda 325 may allow the user to edit their ingredients, make special requests, delete the items from the order, or otherwise modify current order 323. If the user wishes to add items to current order 323, the user may select the option to add item 326, which populates information under menu 327. Add item 326 and menu 327 may correspond to lists, search boxes, interactive menus, or other interfaces enabling the user to add, view, and select items for current order 323. As previously discussed, if other users are in a vehicle with the user of device 310, items selected to add to current order 323 on their respective devices may also appear to the user under current order 323. In other embodiments, current order 323 may apply only to the items selected by the user of device 310 for purchase and not include items selected by other users in the vehicle. Once the user is satisfied with current order 323, the user may select a submit order 328 process to transmit the order to merchant device 350 (e.g., using wireless beacon 344 or over a network connection of device 310) for fulfillment by the merchant.

While the user of device 310 is generating current order 323, additions, deletions, and modifications to the order may appear on ordering display 342 for viewing by the user and other users in the same vehicle as the user. Ordering display 342 displays an order 394 and messages 346. Information displayed on ordering display 342 may be received from device 310 through wireless beacon 344 or from merchant device 350 as the order is entered by a merchant for merchant device 350. Thus, as the user enter information in current order 323 or submits the information to the merchant (e.g., through an intercom), order 394 displays information for the order, including hamburger 324, soda 325, and a total 332. Total 331 may include a cost for order 394, and may further include tax, tip, and/or service charges, in various embodiments. The merchant may also utilize ordering display 342 to transmit messages 346 to the user, including queries as to whether the user would like to modify order 394, if the user is ready to submit order 394, and/or instructions for payment and navigation of a drive through.

User device 310 further includes a payment application interface 330 corresponding generally to the processes and features described in reference to payment application 130 of FIG. 1. Payment application interface 330 includes total 331, payment instruments 322, and a submit for payment 334 process. Total 331 may be imported to the application displaying payment application interface 330 from the application supporting ordering application interface 320. Thus, total 331 may correspond to a total cost for current order 323 and order 394, as previously discussed. In various embodiments, total 331 may also correspond to a split amount due for a total cost of current order 323/order 392. The user may initiate, submit for processing, and/or complete a payment for total 331 by selecting a payment instrument under payment instruments 332, such as payment account 333. Payment instruments may include payment cards, payment accounts, banking accounts, gift cards, and/or other payment and financial related information that may be utilized to provide payment to the merchant. Once payment account 333 is selected, the user may select the submit for payment 334 process, thereby submitting total 331 and payment account 33 to the merchant and/or payment provider for processing.

The merchant may utilize merchant device 350 to view order and payment details. Once an order is submitted to merchant device 350, the order may be displayed under order 394. Thus, the merchant may view hamburger 324 and soda 325 required to be prepared by the merchant. The merchant may view a status 361 of the items/services in order 394, such as a ready 362 and a ready 363 status. Status 361 may inform the merchant whether the items/services are ready for the user, if the items/services can be fulfilled by the merchant, and other relevant information for completing order 394 for the user. Order 394 may also be given an order number 364 that may assist the merchant in tracking order 392. Additionally, the merchant may view a payment status for order 392 under payment status 365. In environment 300, the user has completed a payment for order 394, therefore the merchant may view payment received 366 status under payment status 365.

Figure 4:
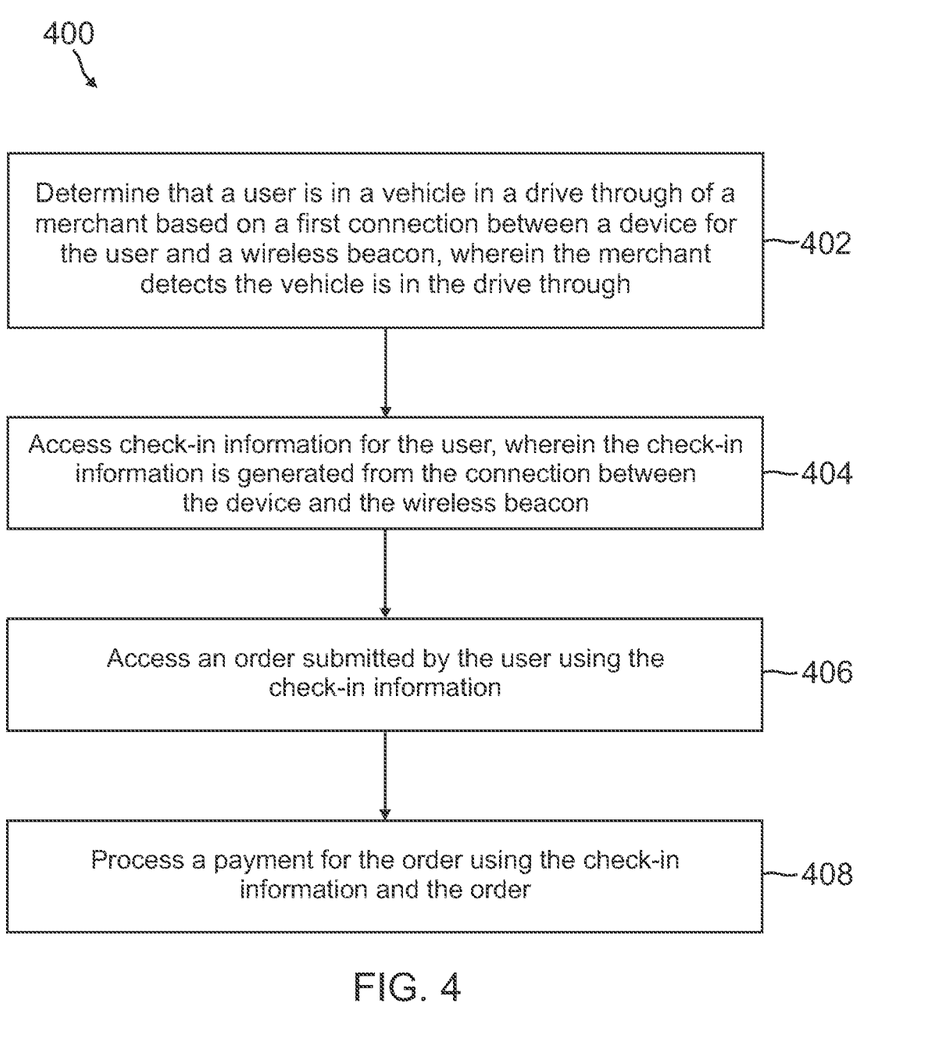
FIG. 4 is a flowchart of an exemplary process for communication of orders and payments in a drive through using wireless beacons, according to an embodiment.

FIG. 4 is a flowchart of an exemplary process for communication of orders and payments in a drive through using wireless beacons, according to an embodiment. Note that one or more steps, processes, and methods described herein may be omitted, performed in a different sequence, or combined as desired or appropriate.

At step 402, it is determined that a user is in a vehicle in a drive through of a merchant based on a first connection between a device for the user and a wireless beacon, wherein the merchant further detects the vehicle in the drive through. For example, the merchant may detect a vehicle in a drive through using video cameras, imaging equipment, image recognition, sensors, and/or scales. Thus, the merchant may also detect a size of the vehicle. If a device connects to a wireless beacon in proximity to the vehicle, it may be determined that a user with the device is in the vehicle. A range for the wireless beacon may be adjusted based on the size of the vehicle. The connection may use one of near field communication, radio communication, infrared communication, Bluetooth communication, Bluetooth Low Energy (BLE) communication, and LTE Direct communication. Additionally, the device may comprise a mobile phone device, a tablet computing device, and/or a console computing device mounted in the vehicle.

Check-in information for the user is accessed, at step 404, wherein the check-in information is generated from the connection between the device and the wireless beacon. The check-in information may comprise user account information for the user and/or an identifier for the user. Thus, at step 406, an order submitted by the user is accessed using the check-in information. The order may be generated by the user when the user is connected to the wireless beacon or may comprise a pre-existing order generated by the user prior to arriving at the drive through in the vehicle. The order may be displayed to the user on the device of the user and/or on a merchant display device in the drive through. The user may also update the order by adding and/or removing items/services in the order or modifying items/services in the order. The order may also comprise a past order based on a previous visit by the user to the merchant, a transaction history for the user, and/or a user account for the user (e.g., favorites and/or past transactions in a user account). The user may modify the order using the device or may give voice input to an intercom that is entered by the merchant to modify the order. Additionally, if other users are in the vehicle, the other users may utilize their devices to add and/or remove items in the order and/or modify the order as appropriate. For example, it may be determine a second user is in the vehicle based on a second connection between a second device and the wireless beacon. Thus, check-in information for the second user may be accessed and the order may be communicated to the second device. The second device may be configured to accept changes to the order by the second user.

At step 408, a payment for the order is processed using the check-in information and the order. The payment may further be processed using a payment account or a payment instrument provided by the user. An identifier or other information in the check-in information may be utilized to identify the payment account or the payment instrument, and may be provided as identification of the user. Additionally, if other users in the vehicle wish to split payment for the order, the first payment request may comprise a first partial payment for the order and a second payment request may be processed for a second partial payment of the order.

Figure 5:
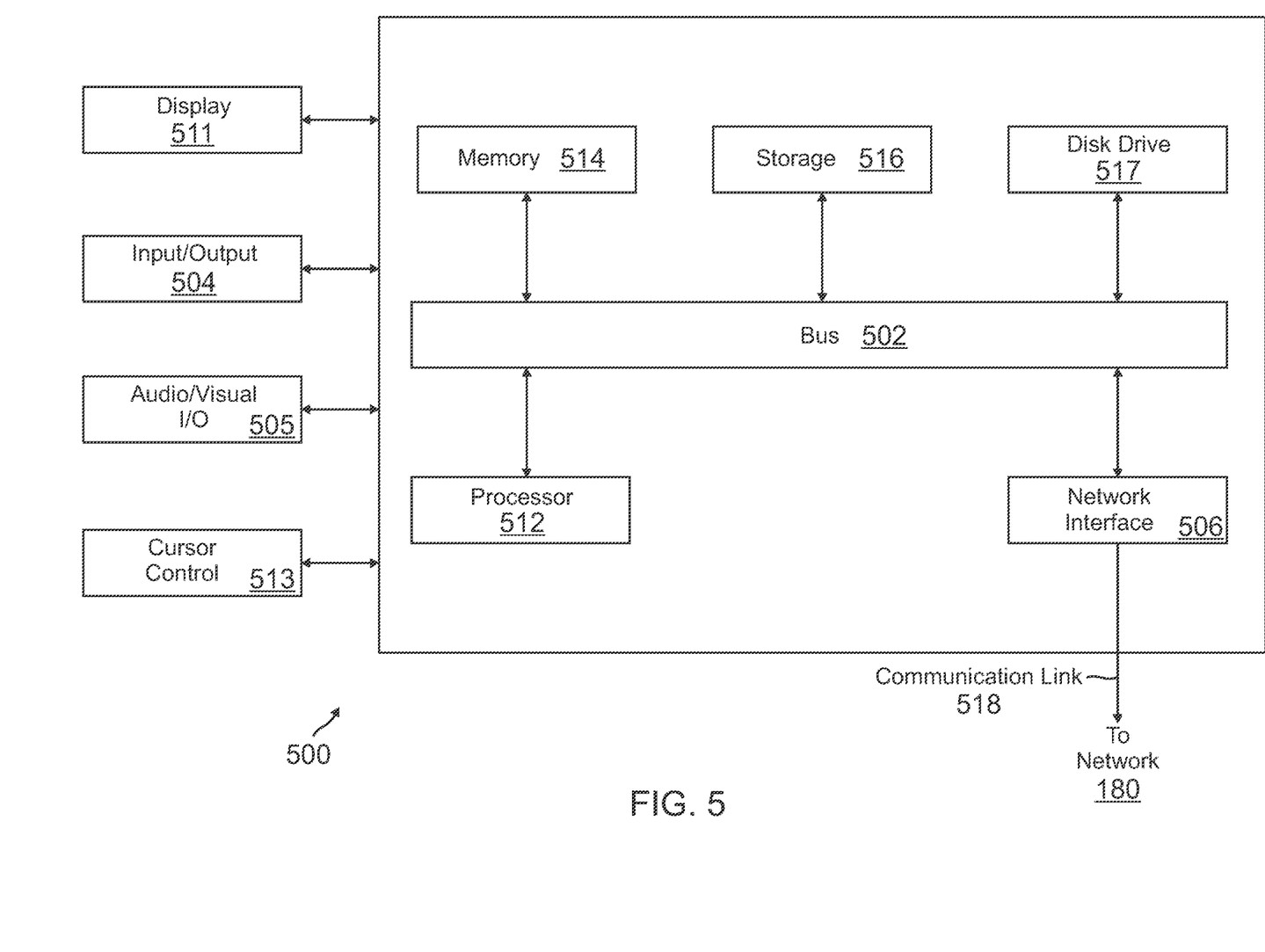
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   sensing a vehicle is in a drive through based on information received from a sensor;
   wirelessly connecting with a first device in the vehicle using a wireless beacon in response to the sensing the vehicle;
   receiving an order request from the first device through the wireless beacon; and
   completing a purchase for the order request in response to the receiving the order request.

2. The system of claim 1, wherein the operations further comprises:
   connecting with a second device in the vehicle using the wireless beacon;
   receiving a second order request from the second device through the wireless beacon; and
   completing a second purchase for the second order request in response to the receiving the second order request.

3. The system of claim 1, wherein the operations further comprise:
   connecting with a second device in the vehicle using the wireless beacon;
   receiving a change to the order request from the second device; and
   changing the order request in response to the receiving the change to the order request.

4. The system of claim 3, wherein the operations further comprise splitting a cost of the purchase between a user of the first device and a second user of the second device.

5. The system of claim 4, wherein the order request includes a first item selected through the first device and a second item selected through the second device.

6. The system of claim 5, wherein the operations further comprise displaying the order request on a merchant device.

7. The system of claim 1, wherein the operations further comprise adjusting a wireless communication range of the wireless beacon in response to the sensing the vehicle.

8. The system of claim 7, wherein the wireless communication range is dependent on a size of the vehicle.

9. A non-transitory computer-readable medium having stored thereon machine-readable instructions that, in response to being executed by a system, cause the system to perform operations comprising:
   sensing a vehicle is in a drive through based on information received from a sensor;

wirelessly connecting with a first device in the vehicle using a wireless beacon in response to the sensing the vehicle;

receiving an order request from the first device through the wireless beacon; and completing a purchase for the order request in response to the receiving the order request.

10. The non-transitory computer-readable medium of claim 9, wherein the operations further comprise adjusting a communication range of the wireless beacon in response to the sensing the vehicle.

11. The non-transitory computer-readable medium of claim 10, wherein the communication range is limited based at least in part on a size of the vehicle.

12. The non-transitory computer-readable medium of claim 9, wherein a range of the wireless beacon is limited to a merchant drive through area.

13. The non-transitory computer-readable medium of claim 12, wherein a range of the wireless beacon is limited by physical boundaries.

14. The non-transitory computer-readable medium of claim 13, wherein the operations further comprise broadcasting an identification token for a check-in application.

15. A computer implemented method, comprising:

sensing a vehicle is in a drive through based on information received from a sensor;

wirelessly connecting with a first device in the vehicle using a wireless beacon in response to the sensing the vehicle;

receiving an order request from the first device through the wireless beacon; and completing a purchase for the order request in response to the receiving the order.

16. The method of claim 15, wherein the wireless beacon is range limited to the drive through.

17. The method of claim 16, wherein the wireless beacon is range limited to the drive through based on a construction of the drive through.

18. The method of claim 16, wherein the wireless beacon is range limited at least in part based on a signal strength.

19. The method of claim 18, wherein the signal strength is based at least in part on a size of the vehicle.

20. The method of claim 16, wherein the wireless beacon is range limited to the drive through at least in part by a construction of the wireless beacon.

* * * * *